United States Patent
Edwards

(10) Patent No.: US 11,006,611 B2
(45) Date of Patent: May 18, 2021

(54) APPARATUS AND METHODS FOR IMPROVING SAFETY OF A PET DURING TRAVEL

(71) Applicant: JME Products, LLC, Tuscon, AZ (US)

(72) Inventor: Jason Edwards, Tuscon, AZ (US)

(*) Notice: Subject to any disclaimer, the term of this patent is extended or adjusted under 35 U.S.C. 154(b) by 169 days.

(21) Appl. No.: 15/727,378

(22) Filed: Oct. 6, 2017

(65) Prior Publication Data
US 2019/0104702 A1 Apr. 11, 2019

(51) Int. Cl.
*A01K 1/02* (2006.01)

(52) U.S. Cl.
CPC .......... *A01K 1/0272* (2013.01); *A01K 1/0263* (2013.01)

(58) Field of Classification Search
CPC .. A01K 1/0236; A01K 1/0272; A01K 1/0281; A01K 1/029
USPC ......... D30/118, 119, 151, 199; D6/333, 330, D6/340; 119/161, 163–170, 482, 484, 119/496–498, 753, 755, 756, 771
See application file for complete search history.

(56) References Cited

U.S. PATENT DOCUMENTS

| | | | |
|---|---|---|---|
| D204,443 S * | 4/1966 | Wood | D6/601 |
| D259,458 S * | 6/1981 | Fuller | 5/655 |
| 4,512,286 A * | 4/1985 | Rux | A01K 1/0272 119/771 |
| 4,583,253 A * | 4/1986 | Hall | B60N 2/2854 297/250.1 |
| 5,133,294 A | 7/1992 | Reid | |
| 5,718,191 A * | 2/1998 | O'Donnell | A01K 1/0281 119/771 |
| 5,915,335 A | 6/1999 | Holt, Jr. | |
| D461,966 S * | 8/2002 | Reece | D30/118 |
| 6,591,787 B1 | 7/2003 | Gantz | |
| 7,111,347 B1 * | 9/2006 | Cottrell | A47D 13/083 5/490 |
| D539,066 S * | 3/2007 | Coquillette | D6/601 |
| 7,234,181 B1 * | 6/2007 | Griggs | A47D 13/08 5/632 |
| D585,606 S * | 1/2009 | Kennedy | D30/144 |
| D672,567 S * | 12/2012 | Sclare | D6/333 |
| 8,607,735 B1 * | 12/2013 | Klinker | A01K 27/002 119/28.5 |
| D733,897 S * | 7/2015 | Rossouw | D24/184 |

(Continued)

OTHER PUBLICATIONS

Solvit Pet Booster Seats (date unknown) located at: http://www.drsfostersmith.com/product/prod_display.cfm?pcatid=22023&cmpid=01cseYY&ref=6191&subref=AA&cmpid=PLA-_-G-_-6191&gclid=Cj0KCQjw09zOBRCqARIsAH8XF1aLGQZwCCmyTRw9ryEnQuMZdfZjf_fjNZGwOt1YBM11ynJT7HAlOlaApv0EALw_wcB.

Primary Examiner — Ebony E Evans
(74) Attorney, Agent, or Firm — Polsinelli PC; Timothy D. Fontes

(57) ABSTRACT

An apparatus for improving the safety of a pet during travel is disclosed. The apparatus includes a body. The body includes a base, a wedge, and a back support. The wedge is positioned along the base. The wedge includes a top end elevated above the base and an inclined surface for supporting torso portions of the pet during travel. The back support is positioned along the base and configured to support a rear portion of the pet during travel. The apparatus may include a restraint system. The restraint system may include a harness which may engage with a portion of the base and may also engage with other portions of the pet. The apparatus may further include a strap assembly coupled to the base which may define at least one strap end for engaging with an anchor point of a vehicle.

19 Claims, 18 Drawing Sheets

(56) References Cited

U.S. PATENT DOCUMENTS

| | | | |
|---|---|---|---|
| D808,194 S * | 1/2018 | Wyborn | .......................... D6/601 |
| 2002/0133881 A1 * | 9/2002 | Vrbas | ..................... A47D 13/08 |
| | | | 5/655 |
| 2006/0096031 A1 * | 5/2006 | Foster | ..................... A47D 13/08 |
| | | | 5/655 |
| 2007/0157891 A1 * | 7/2007 | Wayn | ...................... B60R 22/10 |
| | | | 119/771 |
| 2008/0011234 A1 | 1/2008 | Wilkes | |
| 2009/0126638 A1 | 5/2009 | Bennett | |
| 2010/0018466 A1 | 1/2010 | Austin | |

\* cited by examiner

APPARATUS AND METHODS FOR IMPROVING SAFETY OF A PET DURING TRAVEL

FIELD

The present disclosure generally relates to apparatuses and methods for the security and safety of a pet; and, more particularly, to a safety apparatus and methods for improving the safety of a pet during travel comprising at least a base, a wedge positioned along the base for cradling a torso of the pet, and a back support for supporting a rear portion of the pet.

BACKGROUND

Conventional apparatuses or systems for transportation of a pet may include pet car seats, pet safety seats, general pet carriers, and the like. However, it is believed that conventional systems are generally insufficient for maintaining a pet in place relative to a portion of a vehicle or otherwise, and that conventional systems fail to provide adequate safety and comfort to the pet during travel. For example, conventional dog car seats may merely involve strapping the dog to the seat of an automobile. Yet, as may be expected during travel, the dog may be subjected to random and unpredictable forces stemming from a crash or sudden movement of the automobile. Such unexpected forces may loosen the straps and pull the dog from the surface of the seat. In addition, such forces may be of sufficient strength to shift the position of the dog relative to the seat which may increase anxiety and negatively affect the comfort level of the dog during travel. More substantial movement of the dog relative to the seat may leave the dog flailing about and can result in injury.

It is with these observations in mind, among others, that various aspects of the present disclosure were conceived and developed.

SUMMARY

One implementation of the present disclosure may take the form of an apparatus for improving the safety of a pet during travel, comprising an apparatus for safety of a pet during travel. The apparatus comprises a body defining a front side, a back side formed opposite the front side, a top side, a bottom side formed opposite the top side, a first lateral side, and a second lateral side formed opposite the first lateral side. The body includes a base defined along the bottom side of the body, a wedge positioned along the base, the wedge defining a horizontal portion oriented along a first surface of the base, and an inclined portion extending from the horizontal portion to the front side of the body with the inclined portion terminating at a top end of the wedge defined at the top side of the body, the inclined portion defining an inclined surface. The body further includes a back support positioned at a back side of the body opposite the front side along the first surface of the base. In some embodiments, the apparatus includes a restraint system oriented over the body.

Another implementation of the present disclosure may take the form of a method of making an apparatus for improving the safety of a pet during travel, comprising the steps of providing a base; positioning a wedge along a first portion of the base, the wedge defining a top end elevated above the base and an inclined surface between the top end and the base; positioning a back support along a second portion of the base behind the wedge; and providing a restraining system engageable to at least one attachment point of the base, wherein the inclined surface is configured to cradle a torso portion of the pet and the back support is configured to support a rear portion of the pet during the travel.

Yet another implementation of the present disclosure may take the form of an apparatus, comprising a body. The body comprises a base defined along a bottom side of the body, a wedge positioned along the base, the wedge including an inclined portion and a top end, the top end defined at a top side of the body opposite the bottom side, and a back support positioned along the base at a back side of the body behind the wedge.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

Corresponding reference characters indicate corresponding elements among the view of the drawings. The headings used in the figures do not limit the scope of the claims.

DETAILED DESCRIPTION

Figure 1:
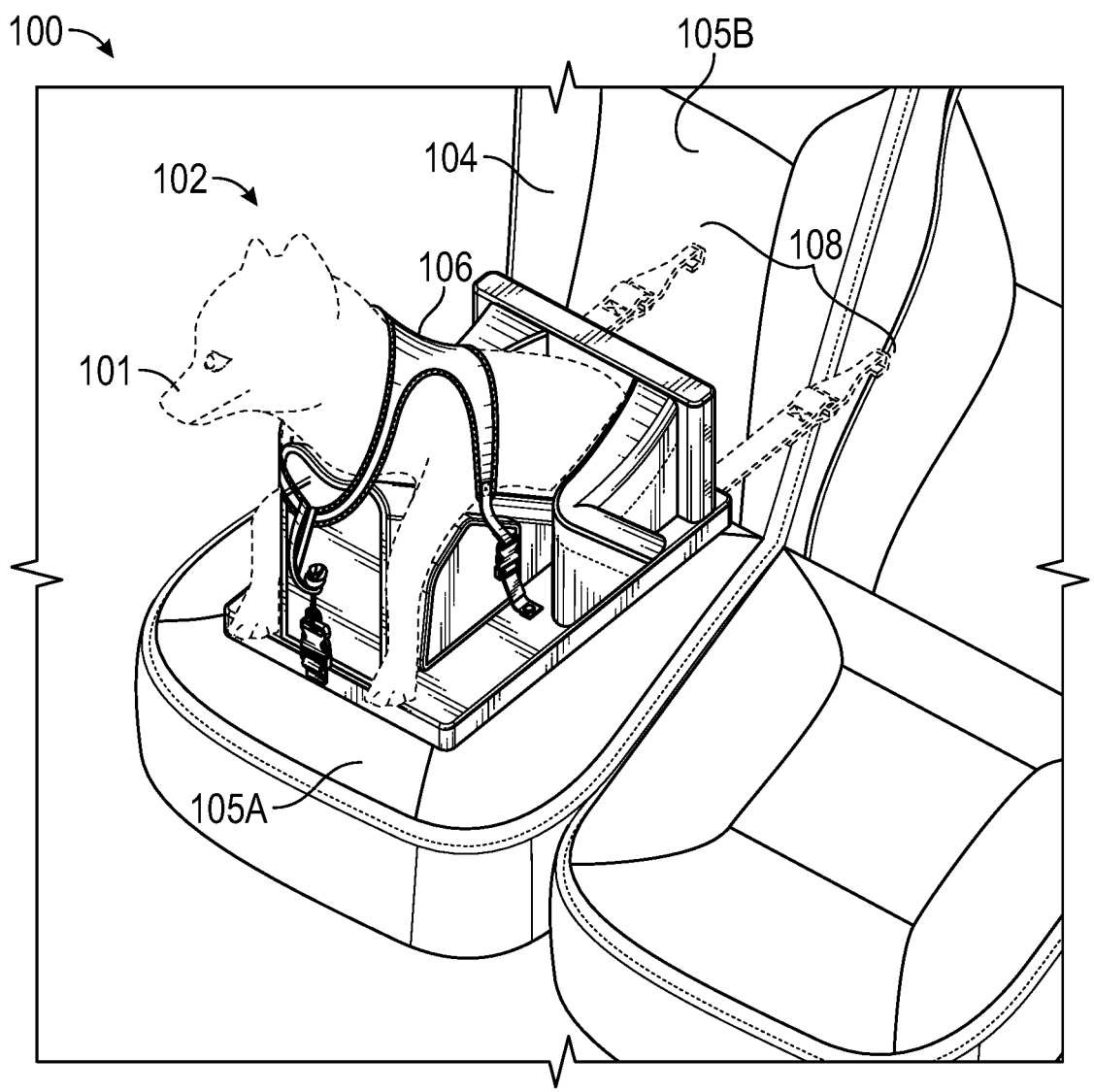
FIG. 1 is a perspective view of an apparatus for safety of a pet during travel with the pet oriented in a sitting position along the apparatus and the apparatus engaged to a car seat, according to aspects of the present disclosure.
Figure 2:
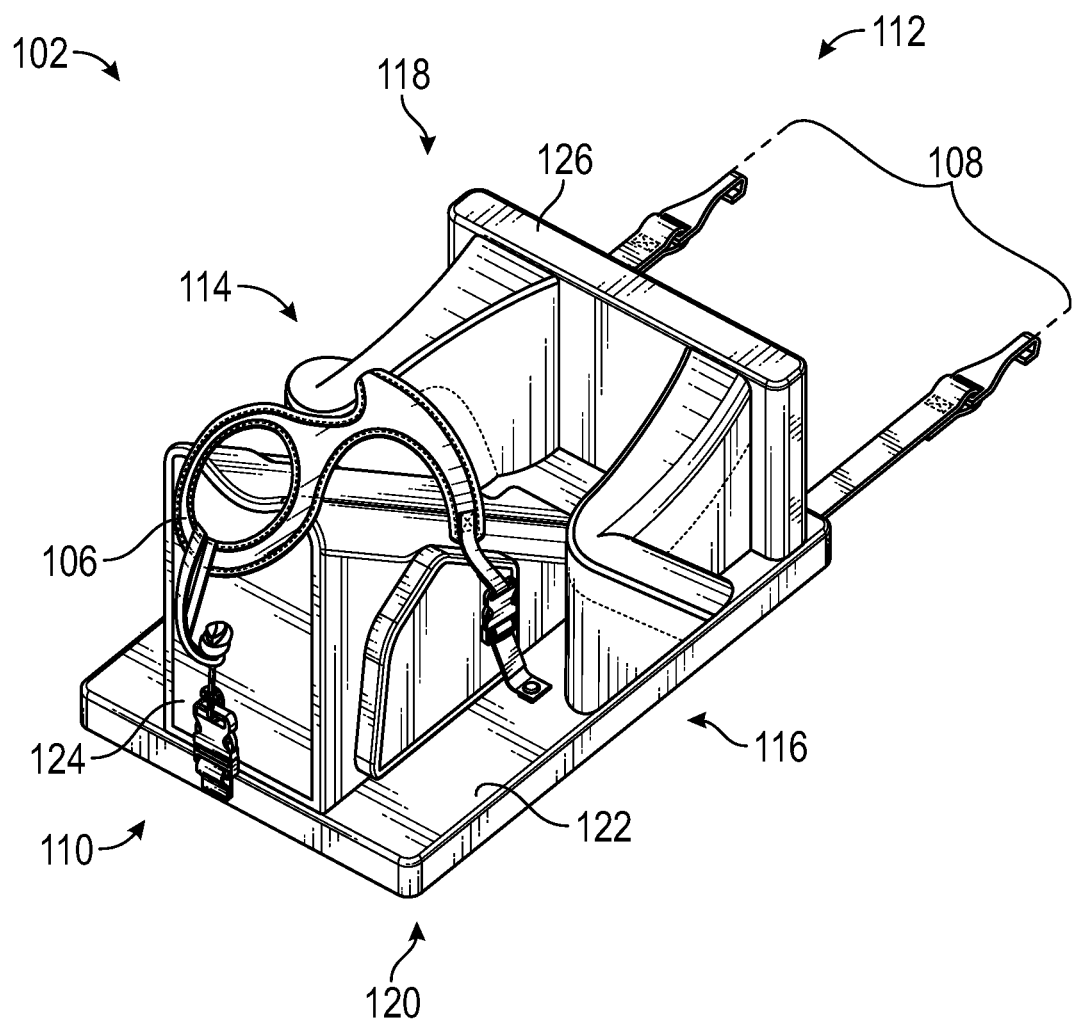
FIG. 2 is a perspective view of the body of the apparatus of FIG. 1, according to aspects of the present disclosure.
Figure 3:
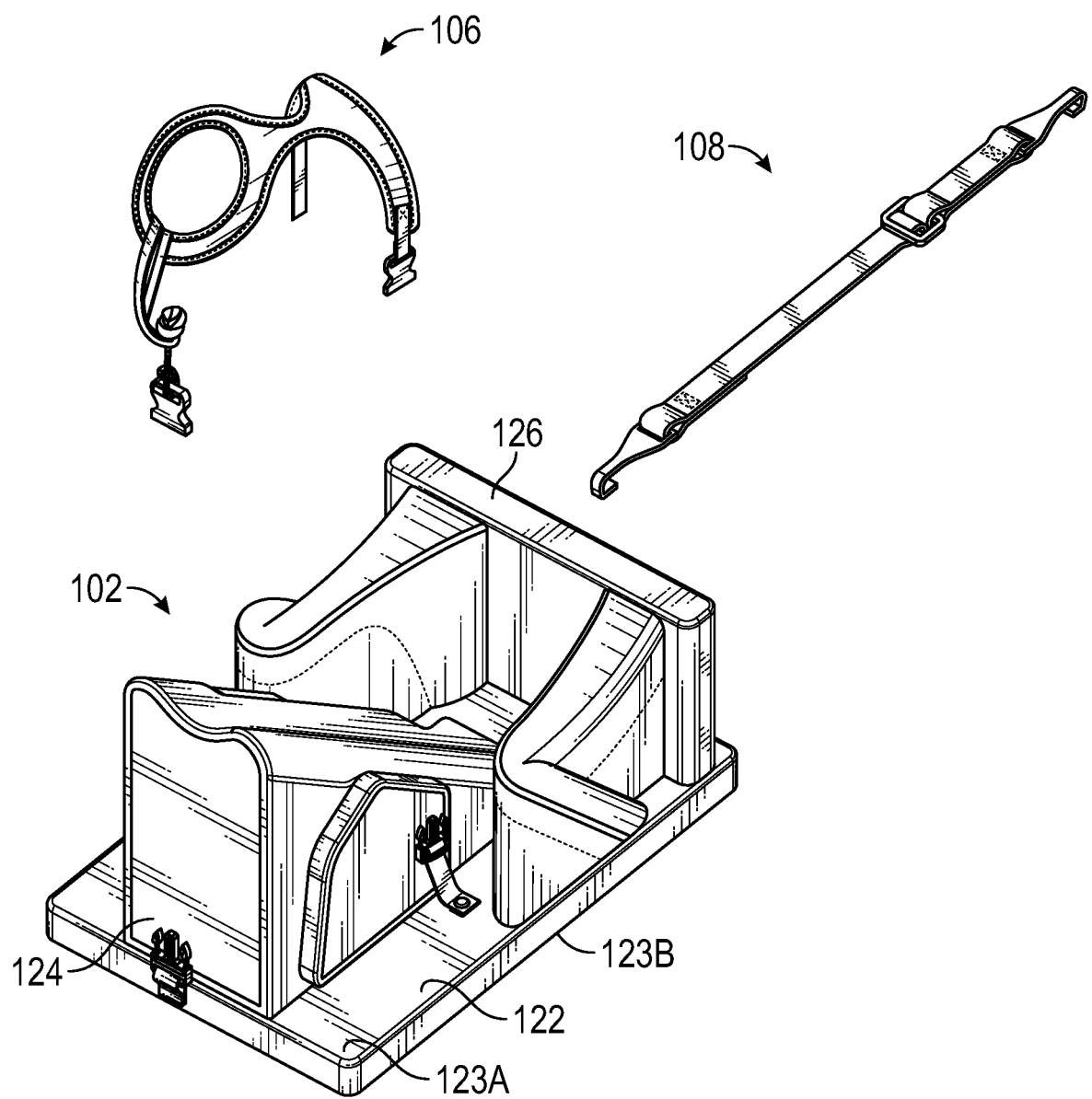
FIG. 3 is an exploded view of the body of the apparatus of FIG. 2, according to aspects of the present disclosure.

Aspects of the present disclosure relate to an apparatus and methods for improving the safety of a pet during travel. An apparatus as described herein may include a body defining a base, a wedge, and back support oriented in an advantageous manner so as to assist with maintaining the pet in a fixed position (such as a sitting position) during travel. Specifically, the base of the body may be disposed on a surface of a vehicle, such as a car seat. The wedge may be oriented along a first portion of the base and may define a horizontal portion oriented along a first surface of the base, a top end defined along a front side of the body and elevated above the base, and an inclined portion defined between the horizontal portion and the top end. An inclined surface defined by the inclined portion and the top end may support a torso portion of the pet during travel. The back support may be positioned along a second portion of the base at a back side of the body behind the wedge. In some embodiments, the back support may be configured to receive and assist to hold in place a rear portion of the pet, such as the pet's back legs and haunches as e.g. the pet is oriented in a sitting position over the body.

In some embodiments, the apparatus includes a restraining system such as a harness. The harness may define a plurality of harness members configured to wrap around portions of the pet, at least one opening for receiving a torso and/or neck of the pet, and a first tightening component to tighten one or more of the harness members about the pet. The restraining system may further include a second tightening component for bringing the harness (and the pet) in closer proximity to the body of the apparatus.

In some embodiments, the apparatus may include a strap assembly for coupling the body of the apparatus to a car seat or other surface. The strap assembly may include a strap positioned along a bottom surface of the body with the strap defining a first strap end and a second strap end. The strap assembly may further include at least one strap adjustment member such as a buckle coupled to the strap to adjust a length of the first strap end and/or the second strap end. The first strap end and the second strap end may be coupled to one or more anchor points of a vehicle as further described herein. Referring to the drawings, embodiments related to an apparatus 100 for improving the safety of a pet during travel are illustrated and generally indicated as apparatus 100 in FIGS. 1-20.

Referring to FIG. 1, a first embodiment and exemplary implementation of the apparatus 100 is shown for improving the safety of a pet during travel or otherwise. The apparatus 100 includes a body 102 which may be positioned on a sitting portion 105A of a seat 104 or chair of a vehicle as shown or positioned in a similar orientation throughout other portions of the vehicle. A pet 101, which may include a dog, cat, or other animal may be oriented in the sitting position depicted such that the pet 101 is facing away from a back portion 105B of the seat 104. A restraining system 106, as further described herein, may be engaged to the pet 101 to maintain the pet in the position shown relative to the body 102 of the apparatus 100 as further described herein. A strap assembly 108 may be implemented to couple the body 102 to anchor points of the seat 104 or other portions of the vehicle to maintain the body 102 in place relative to the seat 104 during travel, as further described herein. The implementation of the apparatus 100 shown is merely exemplary and it should be understood and appreciated that the body 102 of the apparatus 100 may be oriented to various different locations and/or positions within a vehicle while still providing the safety and comfort benefits further elaborated below.

Referring to FIGS. 2-9, the body 102 of the apparatus 100 is illustrated in a pre-implementation configuration. The body 102 may define a front side 110, a back side 112, a first lateral side 114, and a second lateral side 116. The body 102 may further define a top side 118 and a bottom side 120. As shown, the body 102 may include a base 122, a wedge 124 positioned on top of the base 122, and a back support 126 positioned adjacent the wedge 124 along the base 122. The body 102 is not limited to the components or the dimensions shown and it should be understood that like embodiments are contemplated.

As shown, the base 122 is generally defined along the bottom side 120 of the body 102. The base 122 may be substantially planar or flat, to support the wedge 124 and the back support 126 as further described herein. In some embodiments, the base 122 may be manufactured using cloth, foam, plastic, wood, leather, neoprene, vinyl, suede, metal, or combinations of the same. In some embodiments, the base 122 is generally rectangular in shape as depicted; however, the base 122 may comprise other shapes (circular, square-shaped, triangular-shaped, etc.) so long as wedge 124 and the back support 126 may be oriented along the base 122 as described herein. As further shown, the base defines a first surface 123A oriented towards the top side 118 of the body 102, and a second surface 123B oriented towards the bottom side 120 of the body 102. The first surface 123A may be at least partially planar or flat to accommodate the positioning of the wedge 124 and the back support 126 along a horizontal plane (not shown) defined by the base 122 as further described herein. In some embodiments, the second surface 123B may also be at least partially planar or flat so that the base 122 may stably rest on a seat, floor, or other surface of a vehicle.

In some embodiments, the base 122 includes various attachment points 128 such as the attachment point 128A, the attachment point 128B, and the attachment point 128C. The attachment points 128 may be used to fasten components of the restraining system 106 to the base 122 as further described herein. In the embodiment shown, for example, the attachment point 128A may be oriented along a third surface 123C of the base 122 and along the front side 110 of the body 102. The attachment point 128B and the attachment point 128C may be oriented along the first surface 123A in parallel orientation relative to the base 122 as shown. The base 122 is not limited to the attachment points 128 shown and additional embodiments are contemplated which implement more or less of the attachment points 128 depending upon the embodiment or dimensions of the restraining system 106 utilized with the body 102.

The attachment points 128 may define permanent or semi-permanent/non-permanent joints between the base 122 and portions of the restraining system 106 or other components. For example, in some embodiments as described herein, portions of the restraining system 106 may be permanently mechanically joined to the base 122 at one or more of the attachment points 128, such as the attachment points 128B and 128C, using adhesive, nails, rivets, brazing, bolts, machine screws, cementing, welding, crimping, or other like methods and materials. In other embodiments, one or more of the attachment points 128 may define semi-permanent joints which may facilitate the temporary or semi-permanent attachment of the base 122 to portions of the restraining system 106. For example, the attachment point 128A may define a semi-permanent joint between the base 122 and a portion of the restraining system 106 using e.g. a general buckle, a snap-fit buckle, a side release buckle, a blimp buckle, a clasp, a belt buckle, Velcro, a hook-eye component, a button, a back closure, a belt hook, a snap, and the like.

Figure 4:
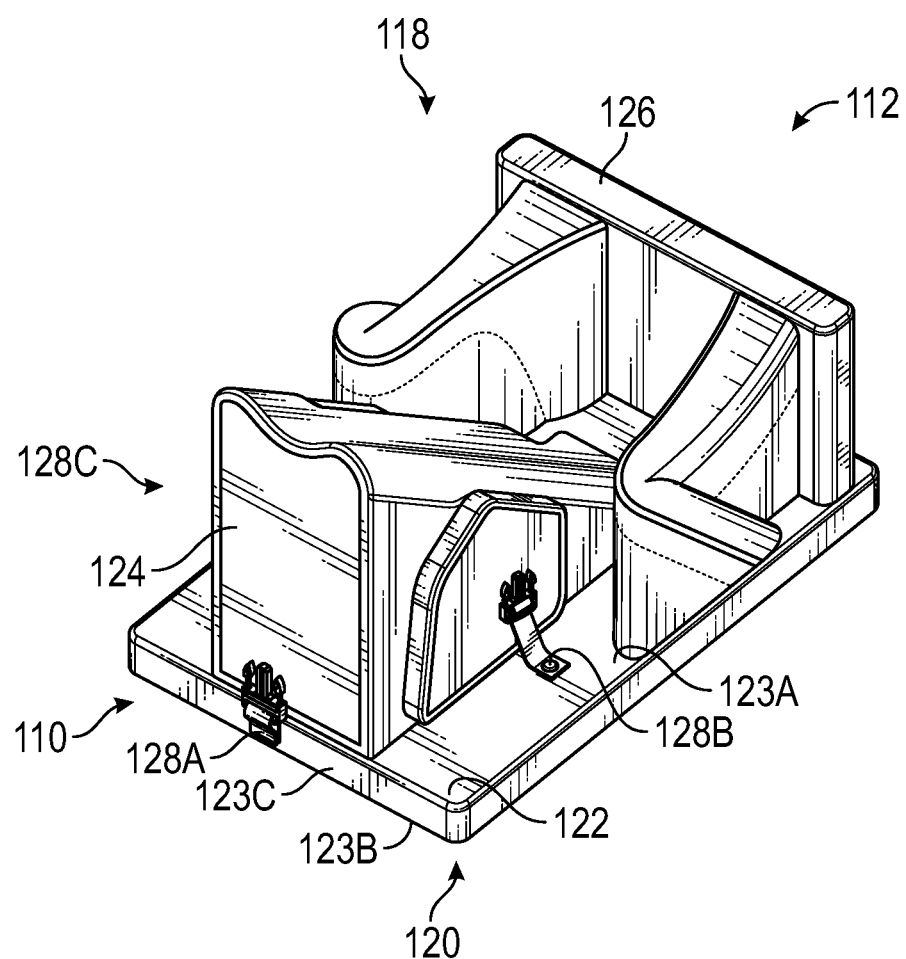
FIG. 4 is a perspective view of the body of the apparatus of FIG. 1, according to aspects of the present disclosure.
Figure 5:
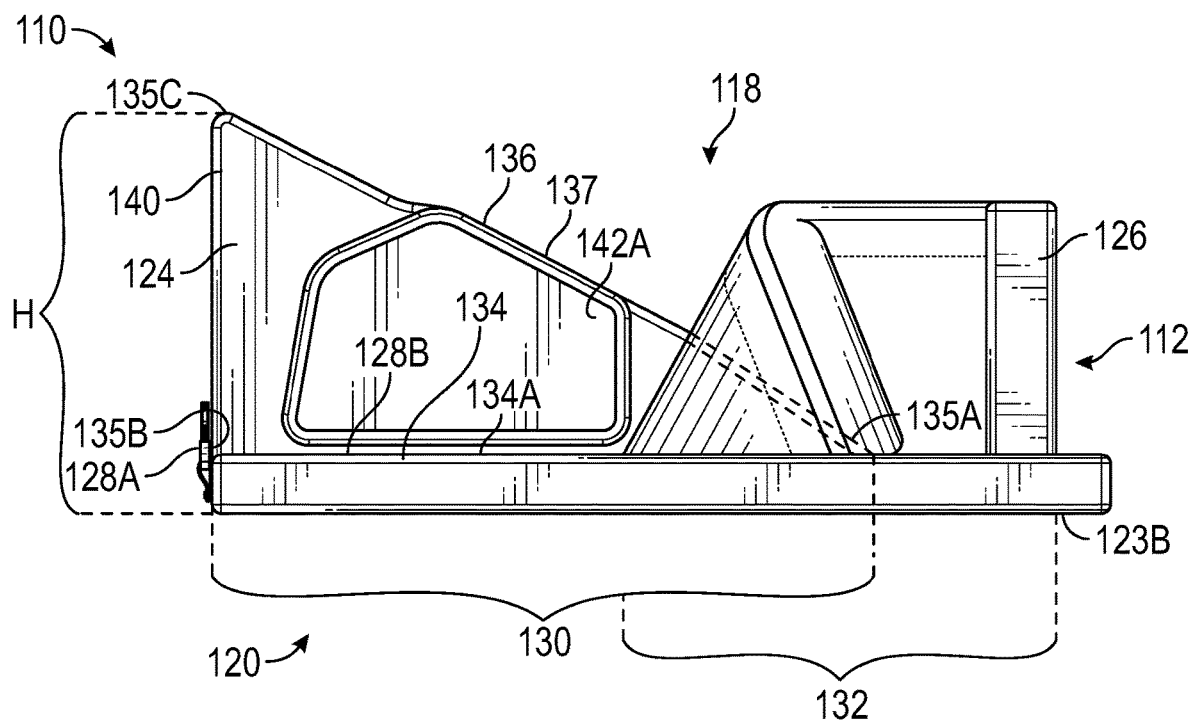
FIG. 5 is first side view of the body of the apparatus of FIG. 1, according to aspects of the present disclosure.
Figure 6:
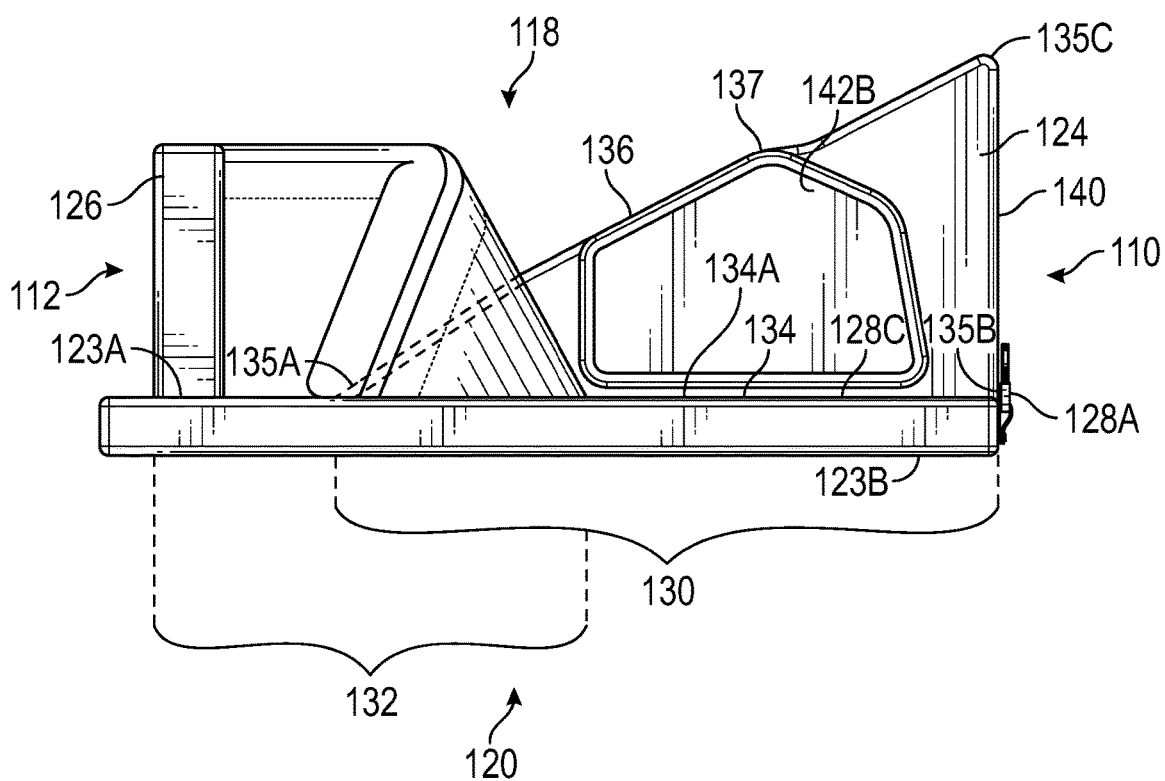
FIG. 6 is a second side view of the body of the apparatus of FIG. 1, according to aspects of the present disclosure.
Figure 7:
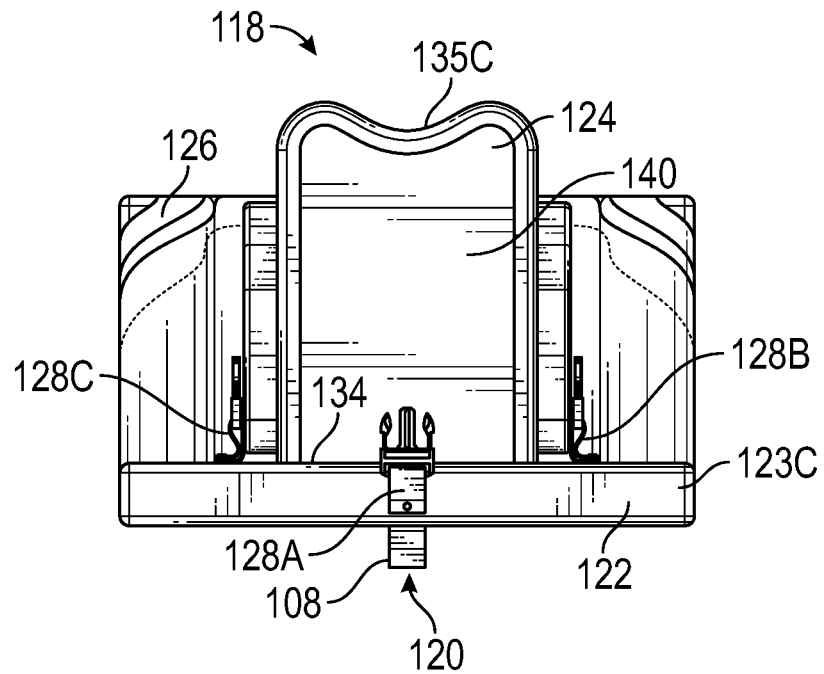
FIG. 7 is a front view of the body of the apparatus of FIG. 1, according to aspects of the present disclosure.
Figure 8:
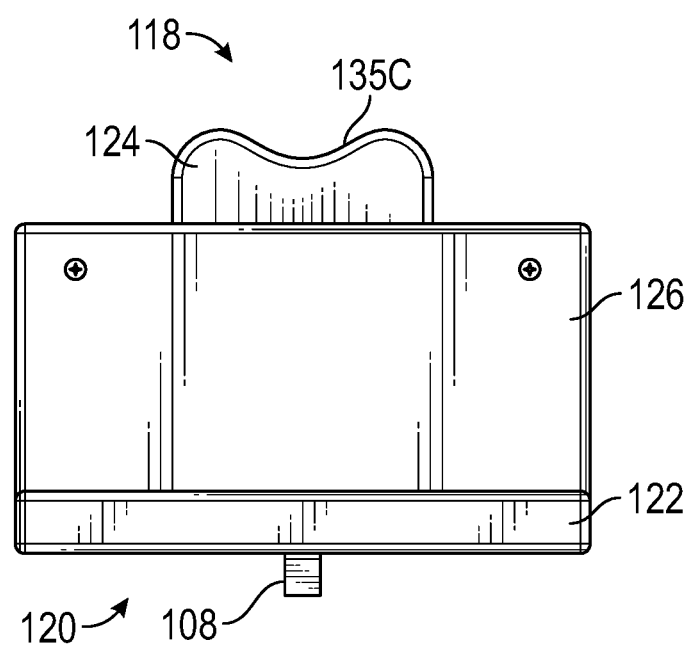
FIG. 8 is a back view of the body of the apparatus of FIG. 1, according to aspects of the present disclosure.

Referring to FIGS. 1-9, and illustrated in greater detail in FIGS. 4-6, the wedge 124 of the body 102 may be positioned along the first surface 123A of the base 122 and generally defined along a first portion 130 of the base 122, a predetermined distance from the back side 112 of the body 102. The wedge 124 may also be generally centered between the first lateral side 114 and the second lateral side 116 of the body 102. The wedge 124 may define a horizontal portion 134 oriented along the first surface 123A of the base 122. As shown, the horizontal portion 134 may extend along the base 122 and may generally terminate at the front side 110 of the body 102. In some embodiments, the horizontal portion 134 of the wedge 124 generally rests on the first surface 123A of the base 122, although intermediate components are contemplated in like embodiments. The horizontal portion 134 may define a generally flat horizontal surface 134A defined along the first surface 123A of the base 122. The wedge 124 may further define a first end 135A positioned a predetermined distance from the back side 112 of the body 102, and a second end 135B defined along the front side 110 of the body 102, such that the first end 135A and the second end 135B of the wedge 124 collectively define the horizontal portion 134 of the wedge 124.

The wedge 124 may further define an inclined portion 136. The inclined portion 136 may generally be defined between a third end 135C of the wedge 124 and the first end 135A of the wedge 124, such that the inclined portion 136 extends from the first end 135A to an elevated position at the third end 135C generally along the front side 110 of the body 102. The inclined portion 136 may define an inclined surface 137 between the third end 135C and the first end 135A of the wedge 124 for supporting a first portion of the pet 101, such as a torso portion. As shown in FIG. 5, the third end 135C may be elevated a predetermined height (H) above the base 122 and the second end 135B, such that the inclined surface 137 slopes downwardly from the third end 135C to the first end 135A. To describe from the perspective of the first end 135A, the inclined portion 136 may be angled slightly and extend along a generally constant gradient from the first end 135A in an upwards direction towards the top side 118 of the body 102, terminating along the third end 135C. As such, a predetermined acute angle (not shown) is defined between the intersection of the horizontal portion 134 and the inclined portion 136 by virtue of the orientations of the first end 135A and the third end 135C respectively. In some embodiments, the inclined portion 136 may terminate at the front side 110 of the body 102, e.g., at the third end 135C. In some embodiments, the third end 135C may define a dimple or other contouring to accommodate the upper chest and/or breastbone of the pet 101. The third end 135C may otherwise be referred to as a top end of the wedge 124.

The inclined surface 137 of the inclined portion 136 is configured to support or otherwise accommodate a general torso portion of the pet 101. Similarly, the third end 135C of the inclined portion 136 is configured to support or otherwise accommodate a breastbone or upper chest area of the pet 101. Specifically, in some embodiments, the height of the third end 135C relative to the horizontal portion 134, designated H, and a length of the wedge 124 defined by the first portion 130, may both be predetermined and specially formed to accommodate the specific dimensions associated with the pet 101 (e.g. length of the pet's torso and height from the pet's feet to its breastbone in a sitting position) so that when the pet 101 is positioned over the wedge 124 and the base 122, the pet 101 naturally rests its breastbone or upper chest portion along the third end 135C, and torso portions of the pet 101 naturally rest along the inclined surface 137 when the pet 101 is oriented in the position indicated in FIG. 1. Orienting the pet 101 in this manner using the novel inclined portion 136 of the wedge 124 and the elevated third end 135C described provides numerous advantages. For example, the inclined surface 137 provides a comfortable and stabilizing support surface which the pet 101 may lean or rest upon as opposed to standing upright by itself during travel. In addition, because the pet's breastbone or upper chest is generally a more rigid, stronger body part compared with other body parts of the pet 101, positioning the third end 135C along such portions of the pet 101 provides a safety contact point between the pet 101 and the apparatus 100, similar to the manner in which a shoulder safety belt is intended to wrap around the stronger upper chest portions of a human, or the manner by which a safety bar of a roller coaster is intended to contact the upper chest portions of a human. Conventional travel devices for pets lack such stabilization and comfort advantages.

As shown, the wedge 124 may further define a vertical portion 140. The vertical portion 140 may be defined along the front side 110 of the body 102 between the third end 135C and the second end 135B. In some embodiments, the vertical portion 140 extends orthogonally from the horizontal portion 134 along the front side 110 of the body 102. In some embodiments, the vertical portion 140 is generally contiguous with the inclined portion 136 and the horizontal portion 134 as shown, such that the wedge 124 at least partially (or entirely) covers the first portion 130 of the base 122. The wedge 124 may further define a first side support 142A adjacent the vertical portion 140, and a second side support 142B defined opposite the first side support 142A. The first side support 142A and the second side support 142B may extend laterally relative to the vertical portion 140 and may contour or otherwise provide additional comfort to the front legs of the pet 101. Additional such comfort features are contemplated and depicted.

Figure 9:
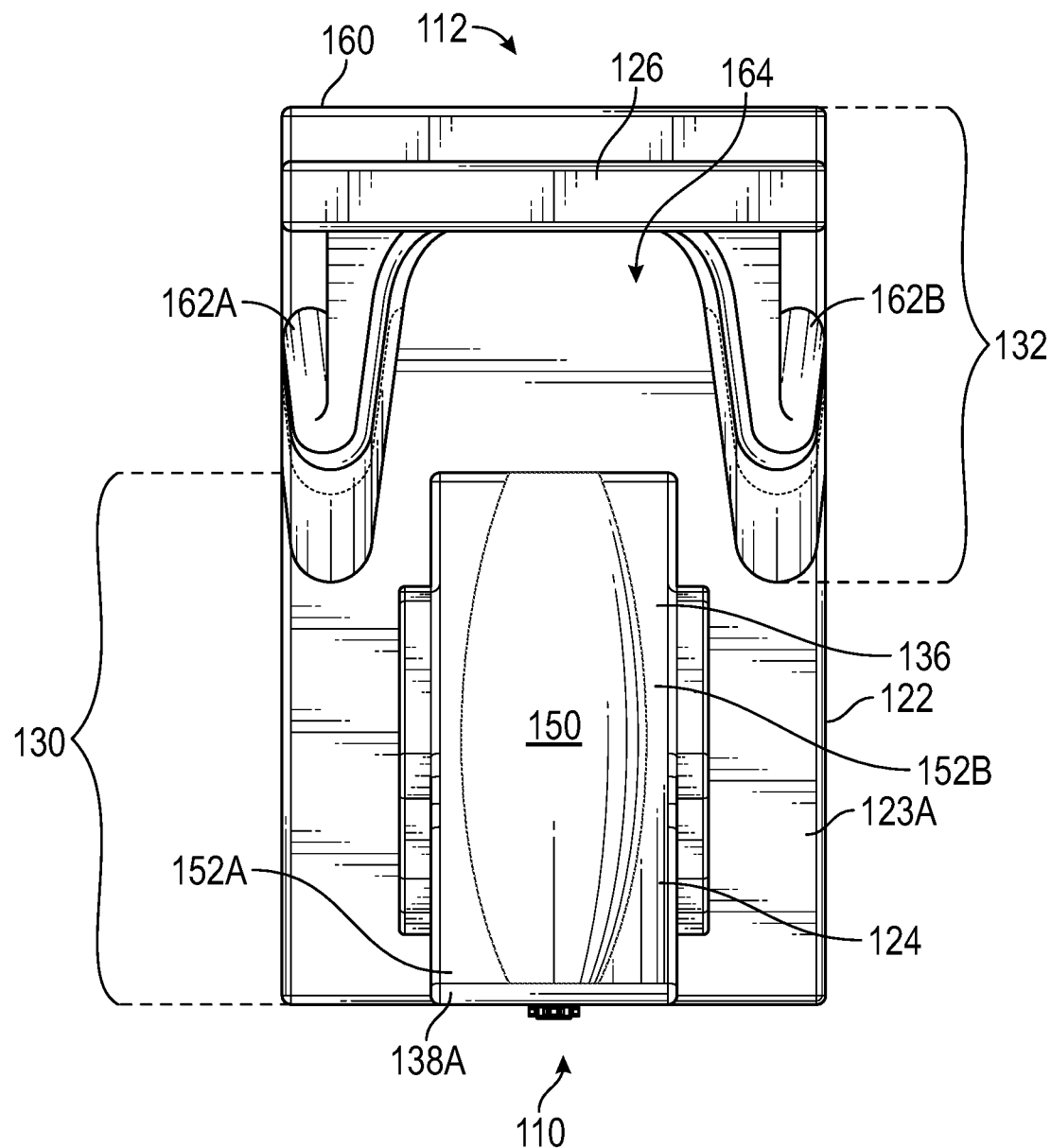
FIG. 9 is a top view of the body of the apparatus of FIG. 1, according to aspects of the present disclosure.
Figure 10:
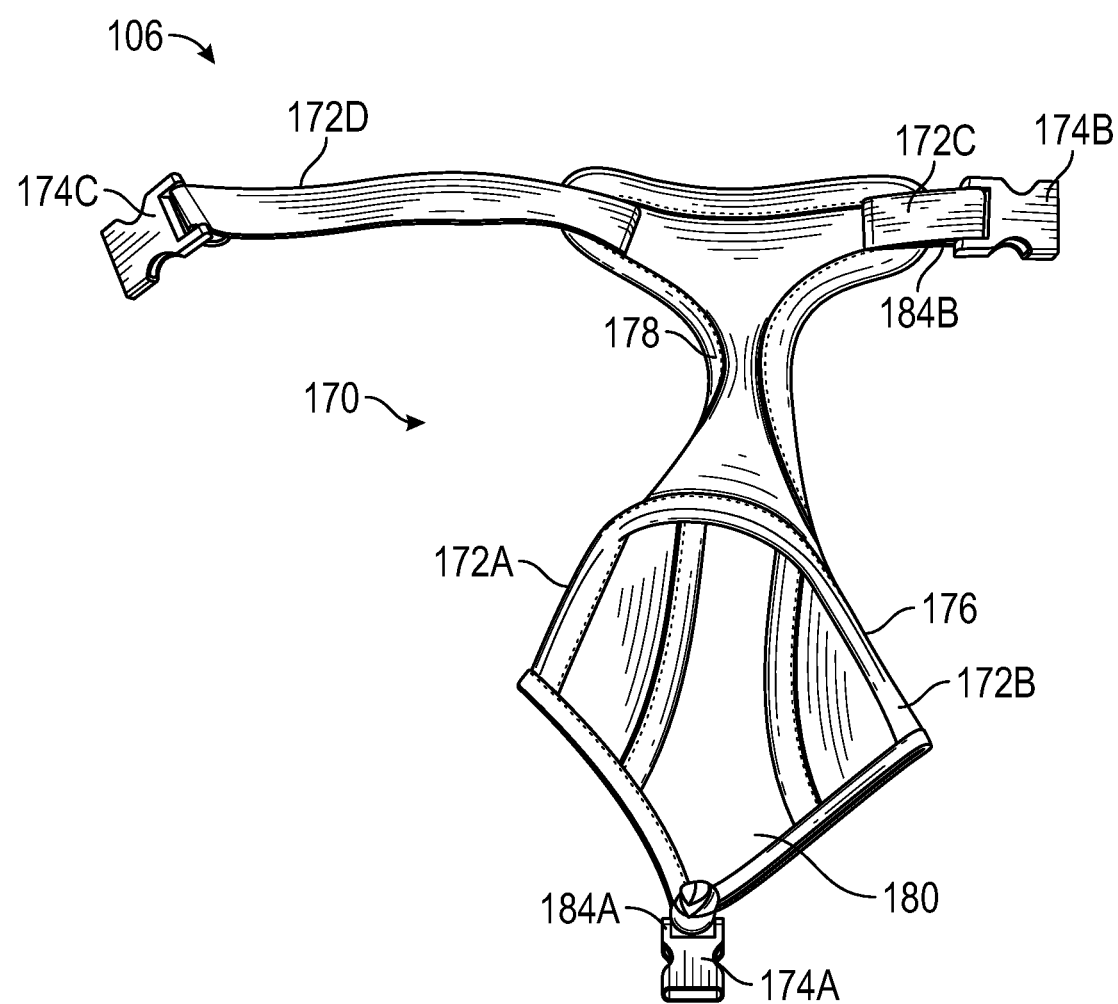
FIG. 10 illustrates one possible restraining system for use with the apparatus, according to aspects of the present disclosure.
Figure 11:
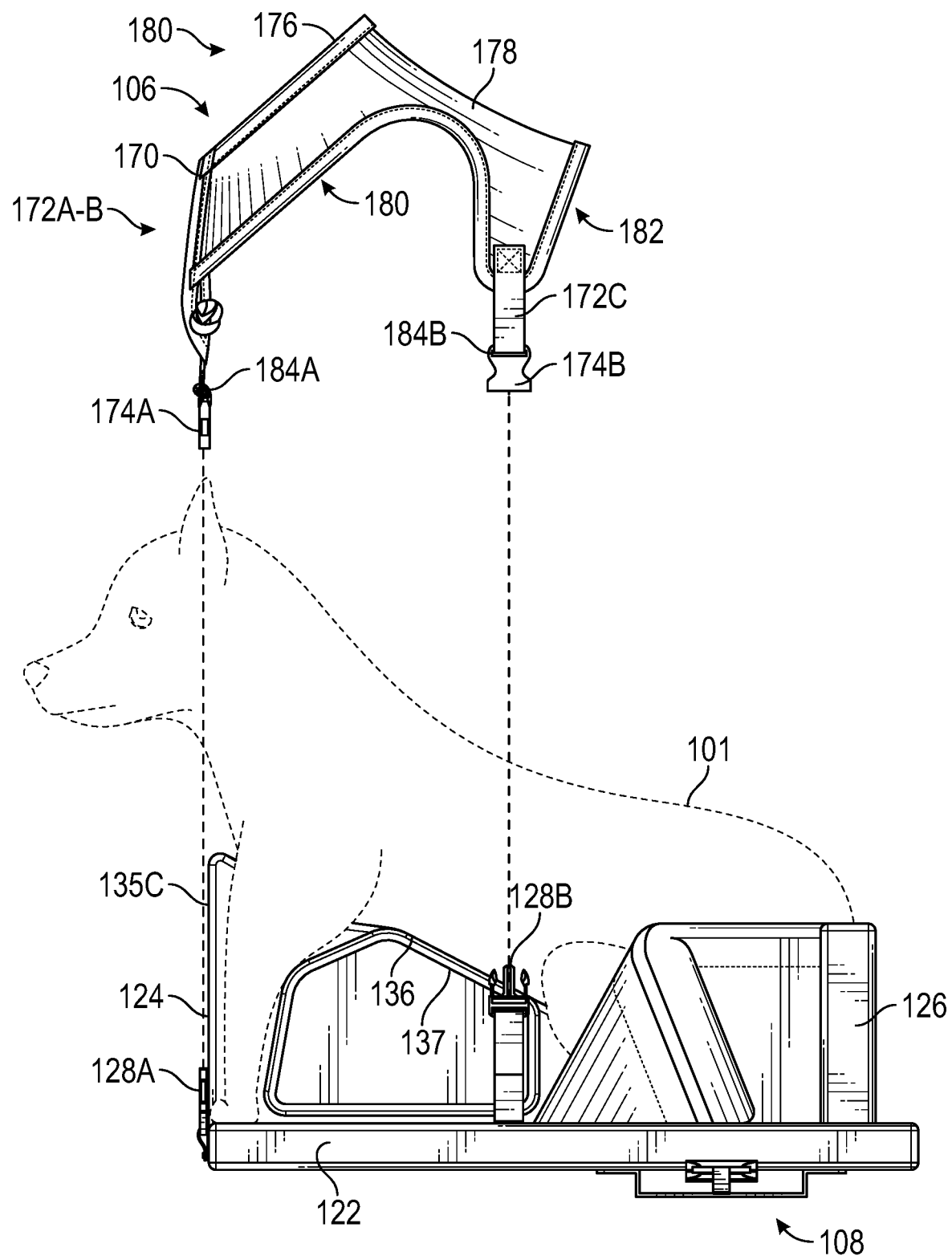
FIG. 11 is a side view illustrating a first configuration associated with the apparatus of FIG. 1 with a pet oriented in a sitting position relative to the apparatus and the restraint system of FIG. 10 being positioned to engage the pet, according to aspects of the present disclosure.
Figure 12:
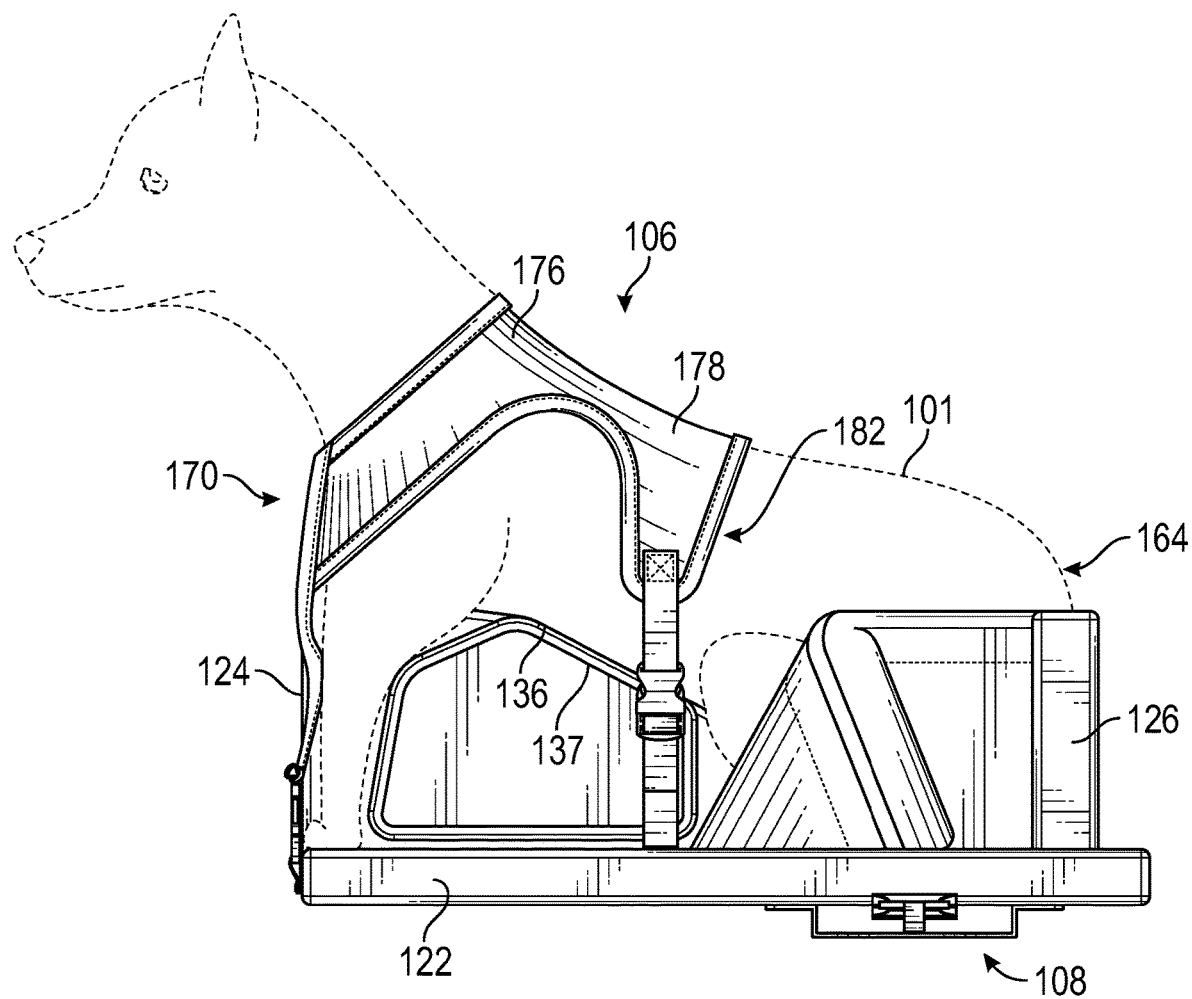
FIG. 12 is a side view illustrating a second configuration associated with the apparatus of FIG. 1 with the pet oriented in the sitting position relative to the apparatus and with the restraint system of FIG. 10 engaging the pet, according to aspects of the present disclosure.
Figure 13:
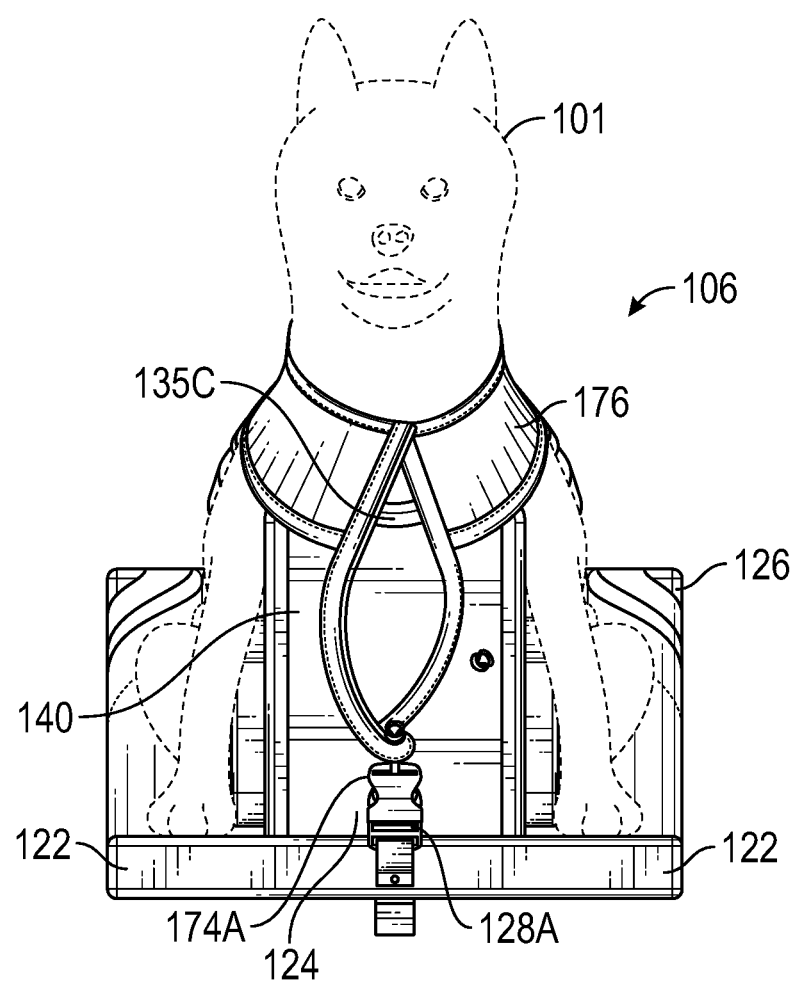
FIG. 13 is a front view of the pet/body combination of FIG. 12, according to aspects of the present disclosure.
Figure 14:
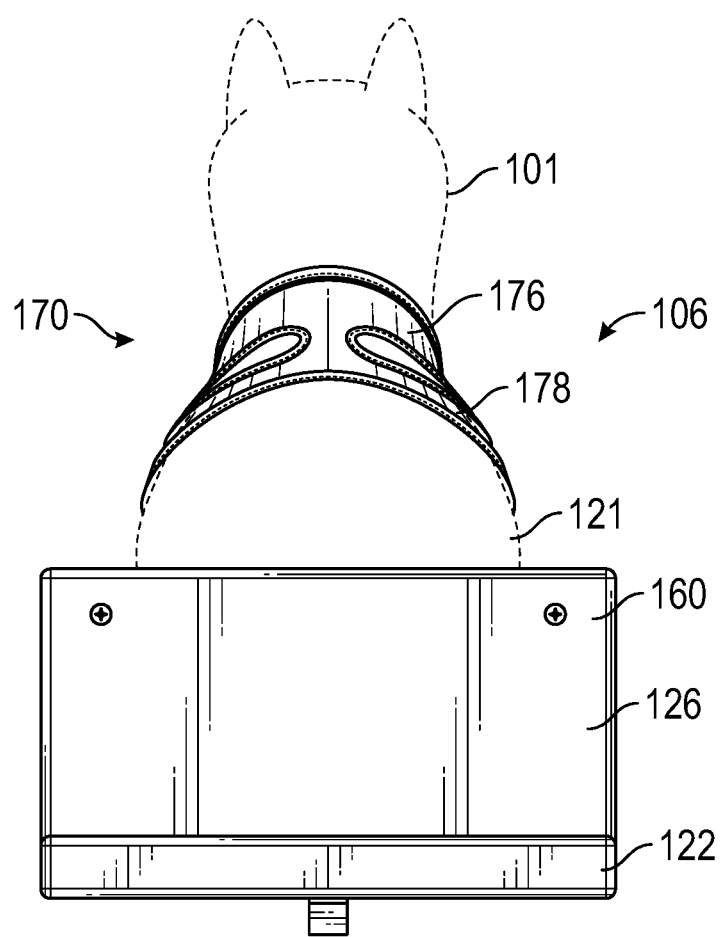
FIG. 14 is a back view of the pet/body combination of FIG. 12, according to aspects of the present disclosure.
Figure 15:
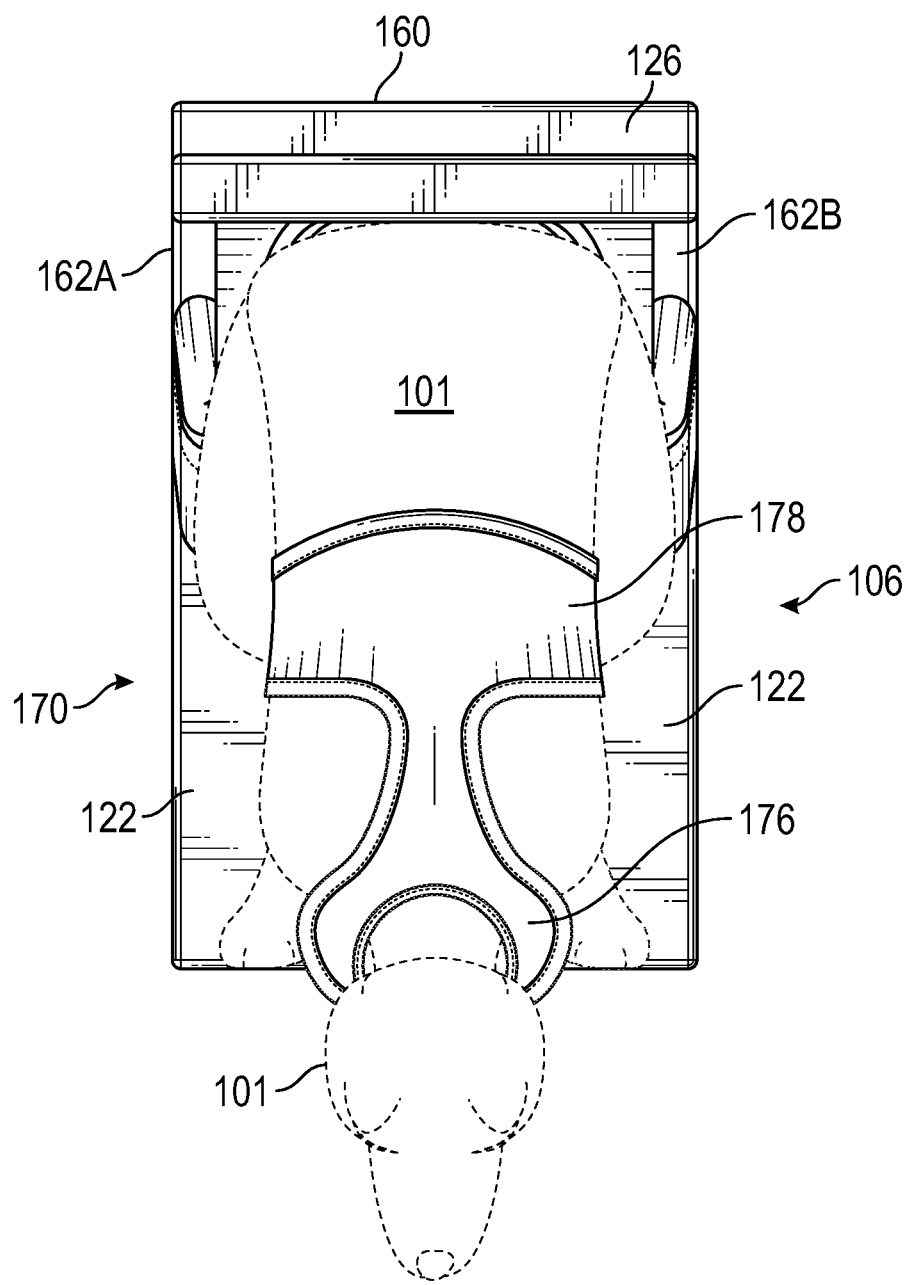
FIG. 15 is a top view of the pet/body combination of FIG. 12, according to aspects of the present disclosure.

Referring specifically to FIG. 9, in some embodiments, the wedge 124 may include a recess 150 defined along the inclined portion 136 as shown. The recess 150 may be arcuate, i.e., the recess 150 may include curved or bowed surfaces to compliment and support the curvature of the stomach or other torso portions of the pet 101. In this embodiment, the wedge 124 may define a first edge 152A and a second edge 152B along opposing sides of the recess 150. When a torso portion of the pet 101 is rested or otherwise in contact against the inclined portion 136, the torso portion may be cradled between the first edge 152A and the second edge 152B and rest at least partially within the recess 150 which may provide additional stability of the pet 101 relative to the body 102 and otherwise increase the comfort of the pet 101.

As described and indicated herein, the wedge 124 may generally define a general three-dimensional (3-D) triangle-shape; however, the wedge 124 is not limited to this particular shape so long as the wedge 124 includes an inclined portion 136 as described for supporting the torso or like portions of the pet 101. Similar to the base 122, the wedge 124 may be formed or manufactured using cloth, foam, plastic, wood, leather, neoprene, vinyl, suede, metal, or combinations of the same. In some embodiments, the wedge 124 may generally define a pillow, and be made up of a cloth bag containing feathers, gel, foam, or include a plastic or rubber inflatable material.

In some embodiments, the wedge 124 may be removable from the base 122. In such embodiments, the wedge 124 may be temporarily fastened to the base 122 in the orientation described using e.g. Velcro straps, clips, or other like fastening components implemented along the horizontal portion 134 to temporarily position the wedge 124 relative to the base 122 as described herein. As such, for example, a first wedge defining a set of first dimensions may be mounted to the base 122 to accommodate a first pet having a first size, and the first wedge may later be removed and replaced with a second wedge defining a different set of dimensions or generally defining a different size than the first wedge to accommodate a second pet of a different size than the first pet. In other embodiments, the wedge 124 may be manufactured together with the base 122 and the body 102 as a single unit. Specifically, for example, the wedge 124 and other parts of the body 102 may be formed using 3-D printing or similar methods, and the apparatus 100 may be customized for accommodating particular sized pets as further described herein.

In some embodiments, the vertical portion 140 of the wedge 124 may comprise e.g. a support member (not shown) extending from a predetermined point along the inclined portion 136 to the horizontal portion 134 to stabilize the third end 135C in a fixed position above the base 122. In some embodiments, the vertical portion 140 may be sufficient to maintain the third end 135C in the fixed position shown such that the wedge 124 may be devoid of a bottom side and/or may not include at least part of the horizontal portion 134 (i.e., the wedge 124 may define an opening (not shown) along the first surface 123A of the base 122). The vertical portion 140 may be in communication and flush with the third surface 123C of the base 122 as shown.

Continuing with FIG. 9, one embodiment of the back support 126 may be formed or otherwise positioned along the back side 112 of the body 102 and along the base 122 behind the wedge 124. The back support 126 may define a back wall 160 extending in a vertical direction orthogonally from the base 122 along the back side 112 of the body 102, a first sidewall 162A oriented adjacent the back wall 160, and a second sidewall 162B oriented opposite the first sidewall 162A. The back wall 160, the first sidewall 162A, and the second sidewall 162B of the back support 126 may collectively define a pocket 164. The rear portions of the pet 101, such as the rear legs and haunches, may be disposed within the pocket 164 such that the rear portions abut surfaces of the back wall 160, the first sidewall 162A, and the second sidewall 162B. In this manner, the back support 126 advantageously maintains the rear portions of the pet 101 in a fixed position relative to the base 122 during travel. In other embodiments, the back support 126 may be devoid of the first sidewall 162A and/or the second sidewall 162B (and the pocket 164) and may just include the back wall 160, such that the rear portion of the pet 101 simply rests along or is otherwise stabilized by the back wall 160. In other embodiments, the back wall 160 may define a general semi-circle shape (not shown), to define the pocket 164 described, without the first sidewall 162A and/or the second sidewall 162B shown. As such, the back support 126 may comprise a sole piece or component positioned along the base 122.

Referring to FIGS. 10-15, one embodiment of the restraining system 106 is illustrated which may be implemented in order to maintain the pet 101 in a relatively stationary position relative to the body 102. In the embodiment shown, the restraining system 106 may include a harness 170. The harness 170 may define a plurality of harness members 172 and a plurality of attachment points 174 which may be coupled to respective attachment points 128 of the base 122 or other components of the apparatus 100. The harness 170 may further define a neck portion 176, and a torso portion 178 in communication with the neck portion 176 as shown. The neck portion 176 may define an opening 180 for receiving the neck of the pet 101, and the torso portion 178 may define an opening 182 for receiving the torso portion 178 of the pet 101.

More specifically, in some embodiments, the neck portion 176 of the harness 170 may include a harness member 172A and a harness member 172B collectively defining an attachment point 174A configured to engage with the attachment point 128A of the base 122. The attachment point 174A may define an adjustment component 184A, such as a strap adjuster, to shorten or lengthen the harness member 172A and the harness member 172B and bring the neck portion 176 in closer proximity to the base 122 when the base 122 is coupled to the harness 170. Similarly, the torso portion 178 of the harness 170 may include a harness member 172C defining an attachment point 174B for joining the harness member 172C to the attachment point 128B of the base 122. The attachment point 174B may define an adjustment component 184B, such as a strap adjuster, to shorten or lengthen the harness member 172C and bring the torso portion 178 in closer proximity to the inclined surface 137 and the base 122. As shown in e.g. FIG. 11, the attachment point 174A compliments and engages with the attachment point 128A, and the attachment point 174B compliments and engages with the attachment point 128B. In some embodiments, the torso portion 178 of the harness 170 may further include a harness member 172D defining an attachment point 174C for joining the harness member 172D to the attachment point 128C of the base 122. In some embodiments, the attachment points 128A-128C of the base 122 and the attachment points 174A-174C of the harness 170 may comprise male-female portions of a respective buckle or other fastening component to temporarily adjoin the harness 170 to the base 122.

In some embodiments, the attachment point 174C defined by the harness member 172D may be pre-engaged or otherwise permanently joined to the attachment point 128C (not shown). As described herein, the components of the restraining system 106 may be permanently or non-permanently joined to portions of the base 122. So, for example, in this embodiment the attachment point 174C may be permanently joined to the attachment point 128C to reduce the likelihood of misplacing the harness 170 and otherwise increase the efficiency of engaging the harness 170 to the pet 101 and the base 122 as described herein.

As shown in FIGS. 11-15, the pet 101 may be oriented in a sitting position over the body 102. In a sitting position as described herein, the rear portions of the pet 101 may be received and secured within the pocket 164 defined by the back support 126, the torso portions of the pet 101 may rest along the inclined surface 137 of the wedge 124, and the breastbone and/or upper chest area of the pet 101 may be oriented along the third end 135C of the wedge 124. Before or after orienting the pet 101 in this sitting position shown, the harness 170 may be engaged to the pet 101 by wrapping the torso portion 178 around the pet 101, and mechanically joining the attachment point 174B with the attachment point 128B, and mechanically joining the attachment point 174C with the attachment point 128C, thereby engaging the torso portion 178 to the pet 101, and forming the opening 182 along the torso portion 178. In addition, the neck portion 176 may be engaged to the pet 101 and the base 122 by sliding the neck of the pet 101 through the opening 180 of the neck portion 176 of the harness 170, and then mechanically joining the attachment point 174A with the attachment point 128A. As described, at least some of the attachment points 174A, 174B, and 174C, and the attachment points 128A, 128B, and 128C may define non-permanent joints between the base 122 and the harness 170; i.e., the attachment points 174A, 174B, and 174C may subsequently be disengaged from the attachment points 128A, 128B, and 128C as needed to release the pet 101.

Figure 16:
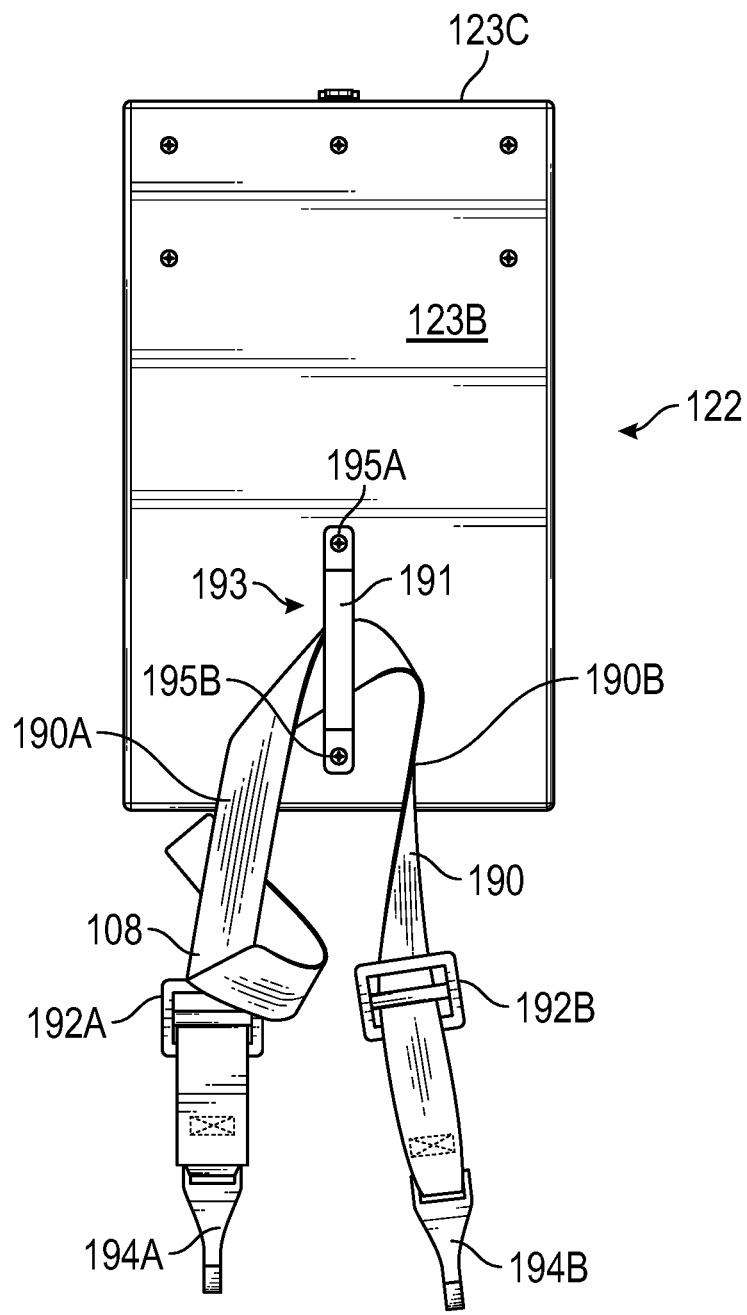
FIG. 16 is a bottom view of the apparatus illustrating a strap assembly for maintaining the body of the apparatus in place relative to a seat, according to aspects of the present disclosure.

Referring to FIG. 16, one embodiment of the strap assembly 108 is illustrated for engaging the body 102 of the apparatus 100 to an attachment point of a vehicle. As shown herein, the strap assembly 108 may be oriented generally along the bottom side 120 of the body 102, and coupled to the second surface 123B of the base 122. In some embodiments, the strap assembly 108 may include a strap 190, defining a first strap end 190A, and a second strap end 190B. The strap assembly 108 may further include a loop member 191 which may comprise a strip of metal or plastic attached to the second surface 123B of the base 122, which generally defines the first strap end 190A and the second strap end 190B. The loop member 191 may be configured to be bowed slightly away from the base 122 along its center and may define a loop aperture 193, through which the strap 190 may be threaded to position the first strap end 190A and the second strap end 190B in the manner shown. Securing members 195A and 195B may maintain respective ends of the loop member 191 in a fixed position along the second surface 123B of the base 122 of the body 102.

In some embodiments, the first strap end 190A may comprise a first buckle 192A which may be implemented to shorten or lengthen the length of the first strap end 190A relative to the loop member 191. Similarly, the second strap end 190B may comprise a second buckle 192B which may be implemented to shorten or lengthen the length of the second strap end 190B relative to the loop member 191.

Adjusting the first strap end 190A and the second strap end 190B may be advantageous for adjusting the position of the body 102 relative to a seat of a car, as further described herein. In addition, the first strap end 190A may include a retaining clip 194A, and the second strap end may include a retaining clip 194B. The retaining clips 194A and 194B may be temporarily latched, connected or otherwise temporarily joined to anchor points of a vehicle, such as anchor points commonly used for connection to a car seat for an infant, as described herein. In some embodiments, the strap assembly 108 may only include a sole buckle, such as the buckle 192A.

Figure 17:
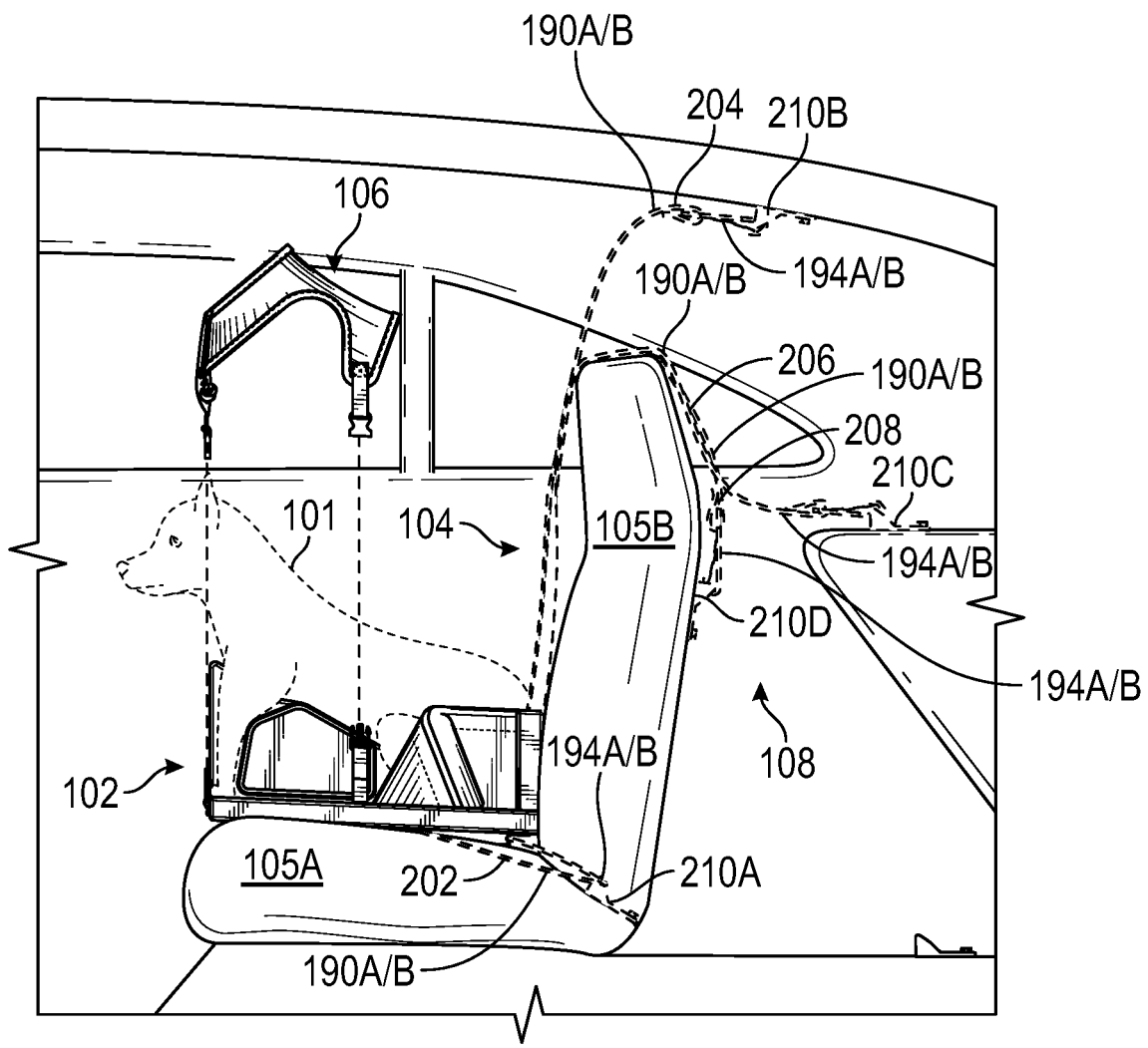
FIG. 17 is a side view of a third configuration associated with the apparatus of FIG. 1 showing possible anchor points within a vehicle which may be engaged with the restraining system, according to aspects of the present disclosure.

FIG. 17 illustrates different configurations of the strap assembly 108 including a first configuration 202, a second configuration 204, a third configuration 206, and a fourth configuration 208 for temporarily joining the strap assembly 108 to various anchor points of a vehicle. For each configuration, at least one of the retaining clips 194A and 194B of the strap assembly 108 may be temporarily joined to at least one of a plurality of possible anchor points 210A-210O of a vehicle as desired. Specifically, for example, in the first configuration 202, the retaining clips 194A and 194B of the first strap end 190A and the second strap end 190B may be engaged to the anchor point 210A which may be positioned between the sitting portion 105A and the back portion 105B of a seat 104. In the second configuration 204, the retaining clips 194A and 194B of the first strap end 190A and the second strap end 190B may be engaged to the anchor point 210B which may be positioned along a roof of a vehicle as shown above the seat 104. In the third configuration 206, the retaining clips 194A and 194B of the first strap end 190A and the second strap end 190B may be engaged to the anchor point 210C which may be positioned along a back portion of the vehicle behind the seat 104. In the fourth configuration 208, the retaining clips 194A and 194B of the first strap end 190A and the second strap end 190B may be engaged to the anchor point 210D which may be positioned along a back side of the back portion 105B of the seat 104. Each of the anchor points 210A-210O may include rings or loops, and the first and/or second strap ends 190A and 190B may be temporarily coupled to any one of the anchor points 210A-210B by engaging the retaining clips 194A and 194B to the loops/rings of the anchor points 210A-210O. In some embodiments, each of the anchor points 210A-210B may include a pair of loops or rings for engaging respectively with the retaining clips 194A and 194B of the first strap end 190A and the second strap end 190B.

Figure 18A:
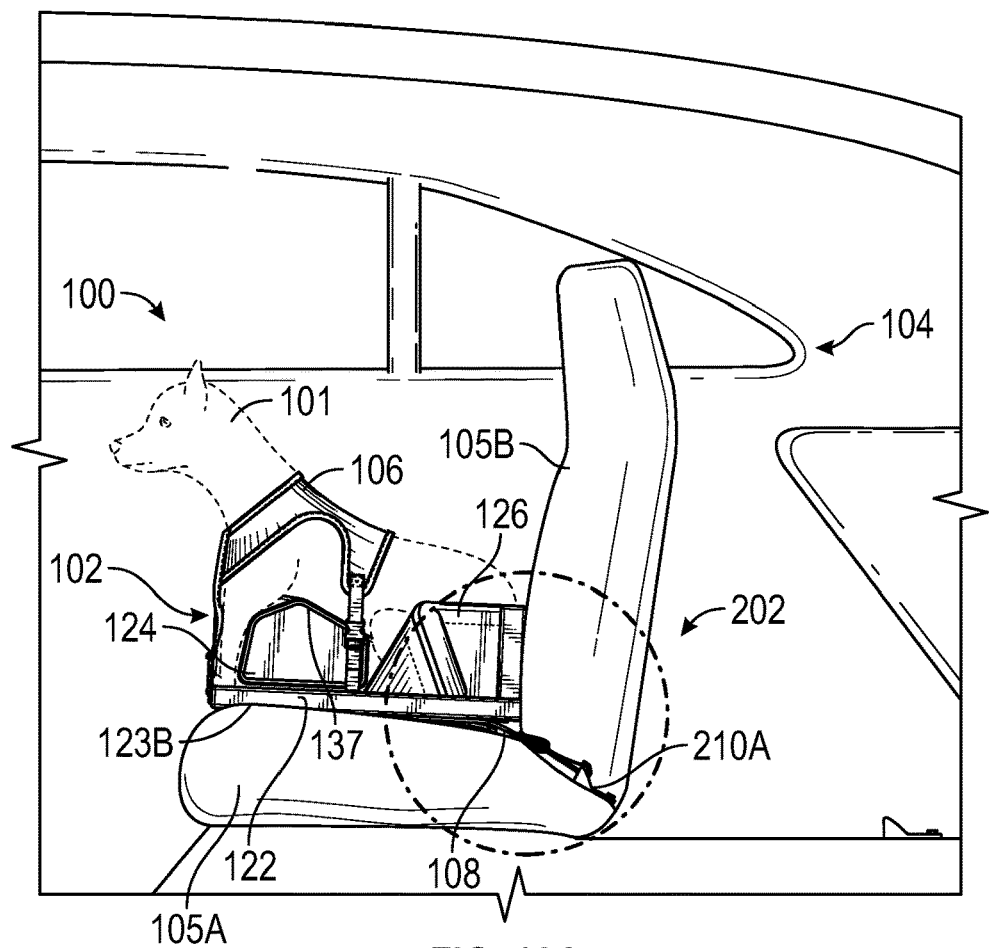
FIG. 18A is a side view illustrating a fourth configuration associated with the apparatus of FIG. 1 with the apparatus positioned within a vehicle and at least one strap end of a strap assembly described herein being positioned to engage a specific anchor point of a vehicle, according to aspects of the present disclosure.
Figure 18B:
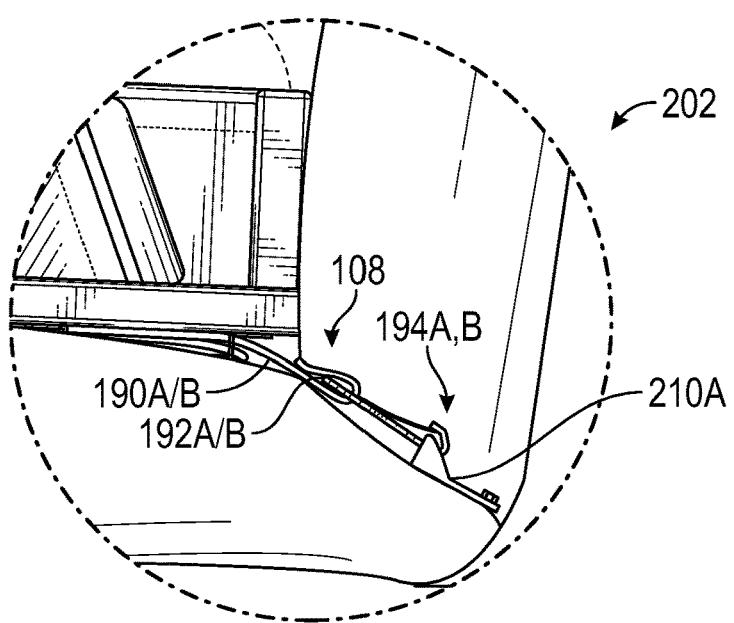
FIG. 18B is a detailed view of FIG. 18A, illustrating possible engagement of the strap assembly of FIG. 18A to the anchor point of a vehicle, according to aspects of the present disclosure.

FIGS. 18A-18B illustrate greater detail regarding the positioning of the apparatus 100 relative to the seat 104; and particularly, illustrate greater detail of the strap assembly 108 in the first configuration 202 engaging the retaining clips 194A and 194B of the first strap end 190A and the second strap end 190B to the anchor point 210A, which may include adjustment of the first strap end 190A and the second strap end 190B. As shown, the body 102 of the apparatus 100 may be positioned along the sitting portion 105A such that the second surface 123B of the base 122 generally rests along the sitting portion 105A and the back support 126 abuts the back portion 105B of the seat 104. As indicated, in the first configuration 202, the first strap end 190A and the second strap end 190B may be threaded between the sitting portion 105A and the back portion 105B of the seat 104 and oriented towards the anchor point 210A. Thereafter, the retaining clips 194A and 194B of the first strap end 190A and the second strap end 190B may be latched or otherwise connected to loops/rings of the anchor point 210A to temporarily join the strap assembly 108 to the anchor point 210A. The first strap end 190A or the second strap end 190B may further be adjusted. For example, decreasing the length of the first strap end 190A using the first buckle 192A may bring the body 102 in closer proximity to the back portion 105B.

As additionally shown, a pet 101, such as a dog, may be placed in a sitting position shown over the body 102, and the restraining system 106 may be engaged to the pet 101 and the body 102 as described herein. With the restraining system 106 securely maintaining the position of the pet 101 in a stationary position relative to the body 102, and the strap assembly 108 securely maintaining the fixed position of the body 102 relative to the seat 104, the apparatus 100 is well-suited for transport of the pet 101 as the apparatus 100 significantly reduces the movement of the pet 101 during transport. In addition, the inclined surface 137 of the wedge 124 provides enhanced stability and comfort to the pet 101.

Figure 19:
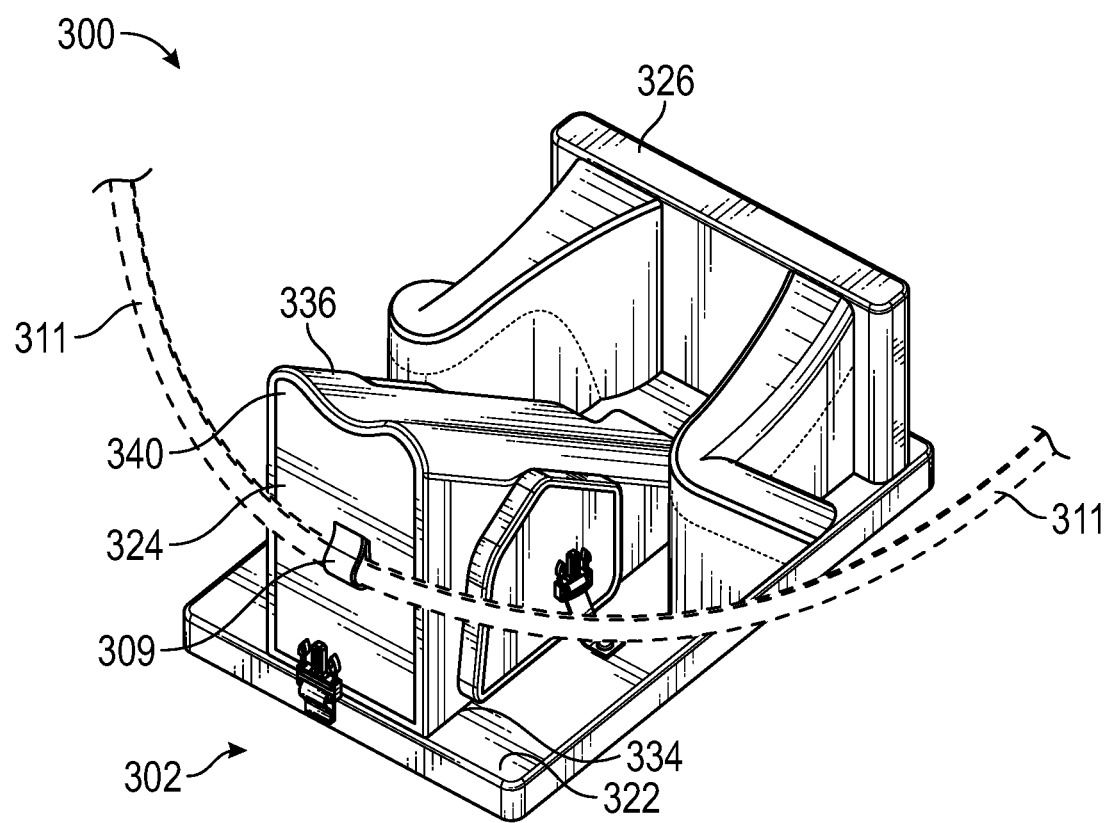
FIG. 19 illustrates a second embodiment of an apparatus for improving the safety of a pet during travel which includes a belt loop for receiving a seat belt or other strap of a vehicle, according to aspects of the present disclosure.
Figure 20:
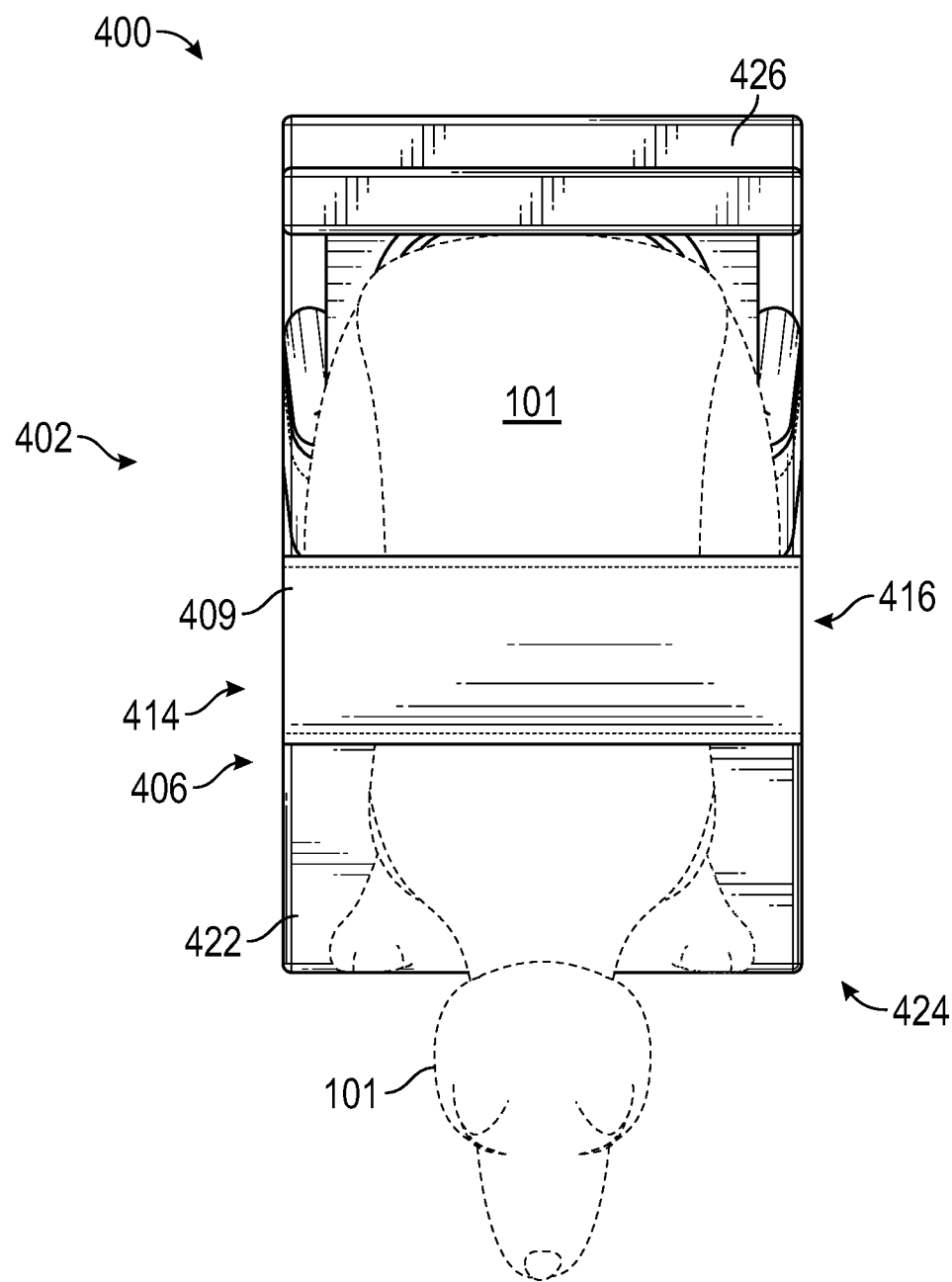
FIG. 20 illustrates a third embodiment of an apparatus for improving the safety of a pet during travel which includes a simpler form of a restraining system, according to aspects of the present disclosure.

FIGS. 19-20 illustrate different embodiments of an apparatus for improving the safety of a pet 101 during travel. Referring to FIG. 19, an apparatus 300 is shown for improving the safety of a pet 101 during travel, similar to the apparatus 100. Like the apparatus 100, the apparatus 300 shown may include a body 302 which may be positioned along the sitting portion 105A of the seat 104 or chair of a vehicle or positioned in a similar orientation throughout other portions of the vehicle. The apparatus 300 may include a restraining system (not shown) similar to the restraining system 106, to maintain a pet 101 in the position shown relative to the body 302 of the apparatus 300. The apparatus 300 may further include a strap assembly (not shown) similar to the strap assembly 108 to couple the body 302 to anchor points (not shown) of the seat 104 or other portions of a vehicle to maintain the body 302 in place relative to the seat 104 during travel. Similar to the body 102, the body 302 may further include a base 322 and a back support 326. The body 302 may include a wedge 324 defining an inclined portion 336, a horizontal portion 334, and a vertical portion 340 similar in configuration to the wedge 124 of the body 102 described herein.

In addition however, as shown, the apparatus 300 may include a belt loop 309 which may be positioned along the vertical portion 340 of the wedge 324. The belt loop 309 is configured to receive a seat belt 311 which may be drawn from one side of the body 302, and through the belt loop 309 as the belt 311 is engaged to a belt buckle (not shown) along an opposite side of the body 302. The belt loop 309, by receiving the seat belt 311, may provide additional stability of the body 302 during travel. It should be understood that in some embodiments the body 102 of the apparatus 100 may also include the belt loop 309. In other embodiments, a groove (not shown), which may be substantially rectangular in shape, may be defined along the lower portion of the vertical portion 340 along the base 322, which may receive the seat belt 311 as it is drawn across the body 302. Other like embodiments for receiving the seat belt 311 are contemplated.

Referring to FIG. 20, an apparatus 400 is shown for improving the safety of a pet during travel, similar to the apparatus 100. Like the apparatus 100, the apparatus 400 shown may include a body 402 which may be positioned along the sitting portion 105A of the seat 104 or chair of a vehicle or otherwise positioned in a similar orientation throughout other portions of the vehicle. The apparatus 400 may include a restraining system 406 similar to the restraining system 106, to maintain a pet 101 in the position shown relative to the body 402 of the apparatus 400. The apparatus 400 may further include a strap assembly (not shown) similar to the strap assembly 108 to couple the body 402 to anchor points (not shown) of the seat 104 or other portions of a vehicle to maintain the body 402 in place relative to the seat 104 during travel. Similar to the body 102, the body 402 may further include a base 422 and a back support 426. The body 402 may include a wedge 424 defining an inclined portion, a horizontal portion, and a vertical portion (not shown) similar to the wedge 124 of the body 102 described herein.

In the embodiment shown however, the restraining system 406 may comprise a flap 409 or other rectangular or elongated member wrapped over the pet 101, as opposed to the harness 170 of the apparatus 100. The flap 409 may be attached to different respective portions of the body 102 using temporary joining mechanisms such as clips, buckles, or even Velcro. In some embodiments, the flap 409 may comprise cloth, plastic, or the like similar to the harness 170. The flap 409 may further comprise various apertures (not shown) to provide breathability and additional comfort to the pet 101. The flap 409 may be wrapped over the body 102 and the pet 101 to and from a first lateral side 414 and a second lateral side 416 of the body 402. The flap 409 may be elongated, or otherwise vary with respect to width and length so long as the flap 409 at least partially wraps over the pet 101 and the body 402.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to such embodiments. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An apparatus for safety of a pet during travel, comprising:
   a body defining a front side, a back side opposite the front side, a top side, a bottom side opposite the top side, a first lateral side, and a second lateral side opposite the first lateral side, the body comprising:
   a base defined along the bottom side of the body, the base defining a front end in alignment with the front side of the body, a back end in alignment with the back side of the body, and a first surface extending from the front end to the back end,
   a wedge positioned along the base and centered between the first lateral side and the second lateral side of the body such that a portion of the first surface of the base along the first lateral side and the second lateral side is devoid of the wedge, the wedge defining a horizontal portion oriented along the first surface of the base, and an inclined portion extending from the horizontal portion to the front side of the body with the inclined portion terminating at a top end of the wedge defined at the top side of the body and along the front side of the body, the inclined portion defining an inclined surface, the wedge further including an incline portion defined along the front side of the body between the top end and the horizontal portion, a first side support defined adjacent the incline portion and extending between the incline portion and the horizontal portion for supporting a first front leg of the pet, and a second side support defined opposite the first side support and extending between the incline portion and the horizontal portion for supporting a second front leg of the pet and a back support positioned at the back side of the body opposite the front side along the first surface of the base and terminating prior to the front side of the body; and a restraint system oriented over the body.

2. The apparatus of claim 1, further comprising:
wherein the inclined surface supports a torso portion of the pet, the back support accommodates a back portion of the pet, and the restraint system is configured to hold the pet in a stationary position relative to the body.

3. The apparatus of claim 1, wherein the inclined portion defines an arcuate recess for supporting a torso portion of the pet.

4. The apparatus of claim 1, wherein the back support defines a back wall extending orthogonally from the base along the back side of the body, a first side wall defined adjacent the back wall, and a second side wall defined opposite the first side wall, the first side wall, the back wall, and the second side wall collectively forming a pocket to receive a back portion of the pet.

5. The apparatus of claim 1, wherein the body is configured to support a sitting position of the pet such that a torso portion of the pet rests along the inclined surface of the wedge, a back portion of the pet and rear legs of the pet abut portions of the back support, and front legs of the pet extend along respective lateral sides of the base with the wedge oriented between the front legs and a breastbone of the pet resting along the top end.

6. The apparatus of claim 5, wherein the wedge is removable from the body, the wedge comprising a size predetermined to be suitable for accommodating the pet such that shoulders of the pet align along the top end and the top end is positioned at a predetermined position above the base to support the breastbone of the pet in the sitting position.

7. The apparatus of claim 1, wherein the inclined surface slopes downwardly from the top end to the horizontal portion.

8. The apparatus of claim 1, wherein the restraint system includes a harness engageable to an attachment portion of the body, the harness defining an opening configured to receive a neck portion of the pet.

9. The apparatus of claim 8, wherein the harness includes a plurality of harness members, a first tightening component to tighten at least one of the plurality of harness members about the pet, and a second tightening component to adjust a distance between the harness and the body to bring the pet in closer proximity to the wedge.

10. The apparatus of claim 1, wherein the vertical portion of the wedge includes a belt loop for receiving a belt of a car seat, the belt extendable around the body and through the belt loop for maintaining the body against the car seat.

11. The apparatus of claim 1, further comprising:
a strap assembly positioned along a second surface of the base opposite the first surface, the strap assembly configured to engage the body to a car seat.

12. The apparatus of claim 11, wherein the strap assembly includes a first strap end and a second strap end extending from the back side of the body in parallel orientation relative to one another, the first strap end and the second strap end engageable to anchor points of the car seat.

13. The apparatus of claim 1, wherein the restraint system includes a flap extending over the wedge to hold the pet in place against the inclined surface.

14. A method of making an apparatus for improving safety of a pet during travel, comprising:
assembling a body, comprising:
providing a base;
positioning a wedge along a first portion of the base, the wedge defining a top end elevated above a front side of the body, the wedge including an inclined surface defined between the top end and the base;
positioning a back support along a second portion of the base behind the wedge; and
providing a restraining system engageable to at least one attachment point of the base,
wherein the inclined surface of the wedge is configured to cradle a torso portion of the pet and the back support is configured to support a rear portion of the pet during the travel, and
wherein the wedge further includes an incline portion defined along the front side of the body between the top end and the horizontal portion, a first side support defined adjacent the incline portion and extending between the incline portion and the horizontal portion for supporting a first front leg of the pet, and a second side support defined opposite the first side support and extending between the incline portion and the horizontal portion for supporting a second front leg of the pet.

15. The method of claim 14, further comprising:
providing a strap assembly for coupling the base to an anchor point of a vehicle, the strap assembly including at least one strap end engageable to the anchor point.

16. The method of claim 14, further comprising:
removing the wedge from the base; and
positioning a different wedge along the first portion of the base, the different wedge accommodating a size of a different pet.

17. The method of claim 14, wherein the restraining system includes a harness, the harness defining a first harness member attachable to a third portion of the base adjacent the wedge, the harness defining a second harness member attachable to a fourth portion of the base adjacent the wedge and opposite the third portion, a portion of the harness extending over the wedge.

18. An apparatus, comprising:
a body defining a front side and a back side opposite the front side, the body comprising:
a base defined along a bottom side of the body,
a wedge positioned along the base, the wedge including an inclined portion and a top end, the top end defined at a top side of the body opposite the bottom side, and
a back support positioned along the base at the back side of the body behind the wedge,
wherein the base includes a first surface, the first surface being planar and oriented towards the top side of the body, with at least a portion of the first surface being defined along the front side of the body, and wherein the wedge further includes an incline portion defined along the front side of the body between the top end and the horizontal portion, a first side support defined adjacent the incline portion and extending between the incline portion and the horizontal portion for supporting a first front leg of the pet, and a second side support defined opposite the first side support and extending between the incline portion and the horizontal portion for supporting a second front leg of the pet.

19. The apparatus of claim 18, further comprising:

a restraint system oriented over the body for maintaining a pet in a stationary position relative to the body; and a strap assembly for coupling the base to an anchor point of a vehicle, the strap assembly including at least one strap end engageable to the anchor point, wherein the restraint system includes a harness configured to wrap at least partially about the pet, and wherein the wedge, the back support, the restraint system, and the strap assembly collectively maintain the pet in a fixed position relative to a portion of the vehicle during travel.

* * * * *